(12) United States Patent
Choi et al.

(10) Patent No.: US 11,352,064 B2
(45) Date of Patent: Jun. 7, 2022

(54) SIDE SILL STRUCTURE FOR VEHICLE

(71) Applicants: HYUNDAI MOTOR COMPANY, Seoul (KR); KIA MOTORS CORPORATION, Seoul (KR)

(72) Inventors: Ji Ho Choi, Hwaseong-si (KR); Seung Ho Noh, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 117 days.

(21) Appl. No.: 17/008,084

(22) Filed: Aug. 31, 2020

(65) Prior Publication Data
US 2021/0179181 A1 Jun. 17, 2021

(30) Foreign Application Priority Data
Dec. 16, 2019 (KR) .................... 10-2019-0167610

(51) Int. Cl.
| | |
|---|---|
| *B60J 7/00* | (2006.01) |
| *B62D 25/02* | (2006.01) |
| *B60R 3/02* | (2006.01) |
| *B60K 1/04* | (2019.01) |
| *B62D 21/15* | (2006.01) |

(52) U.S. Cl.
CPC .............. *B62D 25/025* (2013.01); *B60K 1/04* (2013.01); *B60R 3/02* (2013.01); *B60K 2001/0438* (2013.01); *B62D 21/157* (2013.01)

(58) Field of Classification Search
CPC ........ B62D 25/025; B62D 25/04; B61D 7/00; B61D 7/18; B61G 7/10; Y02E 60/10; E21D 23/0409
See application file for complete search history.

(56) References Cited

U.S. PATENT DOCUMENTS

| | | | | |
|---|---|---|---|---|
| RE19,975 E | * | 5/1936 | Swallow | B62D 25/025 296/209 |
| 3,455,595 A | * | 7/1969 | Eggert, Jr. | B60H 1/0055 296/208 |
| 3,641,943 A | * | 2/1972 | O'Neill | B61D 17/10 105/418 |
| 4,014,587 A | * | 3/1977 | Eggert, Jr. | B62D 21/10 296/204 |
| 4,355,842 A | * | 10/1982 | Hira | B60R 13/04 280/164.2 |
| 4,392,684 A | * | 7/1983 | Yoshitsugu | B62D 25/025 296/203.03 |
| 4,471,992 A | * | 9/1984 | Matsuura | B62D 25/04 296/198 |
| 4,532,671 A | * | 8/1985 | Endo | B60N 3/046 16/7 |
| 4,561,690 A | * | 12/1985 | Shinjo | B60J 5/0409 292/336 |

(Continued)

*Primary Examiner* — Kiran B Patel

(74) *Attorney, Agent, or Firm* — Lempia Summerfield Katz LLC

(57) ABSTRACT

A side sill structure for a vehicle includes: a side sill which is connected to an edge of a center floor and has a first cavity and a second cavity which are divided by a partition; a reinforcing member which is received in the first cavity of the side sill and is deformable by an impact load; and a component which is accommodated in the second cavity of the side sill. In particular, the second cavity is located above the first cavity.

12 Claims, 8 Drawing Sheets

(56) References Cited

U.S. PATENT DOCUMENTS

| | | | | | |
|---|---|---|---|---|---|
| 4,582,357 | A | * | 4/1986 | Nakamura | B62D 25/025 296/155 |
| 4,593,949 | A | * | 6/1986 | Tanimoto | B62D 25/2036 296/193.07 |
| 5,002,333 | A | * | 3/1991 | Kenmochi | B62D 21/10 296/204 |
| 5,209,166 | A | * | 5/1993 | Tylisz | B61D 17/02 105/1.1 |
| 5,700,049 | A | * | 12/1997 | Shibata | B62D 24/02 296/187.09 |
| 5,921,618 | A | * | 7/1999 | Mori | B62D 25/025 296/187.12 |
| 5,954,390 | A | * | 9/1999 | Kleinhoffer | B62D 25/025 296/203.01 |
| 6,073,992 | A | * | 6/2000 | Yamauchi | B62D 25/02 296/203.01 |
| 6,854,795 | B2 | * | 2/2005 | Yamazaki | B62D 21/157 296/187.12 |
| 10,160,499 | B2 | * | 12/2018 | Cooper | B62D 29/043 |
| 10,464,406 | B2 | * | 11/2019 | Kawabe | B62D 25/2018 |
| 10,899,392 | B2 | * | 1/2021 | Min | B62D 27/02 |
| 2011/0298246 | A1 | * | 12/2011 | Mildner | B62D 25/2027 296/193.07 |
| 2012/0091762 | A1 | * | 4/2012 | Pohl | B62D 25/025 296/209 |
| 2020/0148271 | A1 | * | 5/2020 | Kim | B62D 21/152 |
| 2021/0179181 | A1 | * | 6/2021 | Choi | B62D 25/2036 |

* cited by examiner

SIDE SILL STRUCTURE FOR VEHICLE

CROSS-REFERENCE TO RELATED APPLICATION

This application claims priority to and the benefit of Korean Patent Application No. 10-2019-0167610, filed on Dec. 16, 2019, the entire contents of which are incorporated herein by reference.

FIELD

The present disclosure relates to a side sill structure for a vehicle, and more particularly, to a side sill structure for a vehicle capable of firmly supporting a battery assembly and uniformly distributing an impact load.

BACKGROUND

The statements in this section merely provide background information related to the present disclosure and may not constitute prior art.

Lately, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is equipped with a high-voltage battery assembly which is mounted to a vehicle body. The high-voltage battery assembly includes one or more battery cells (or battery modules), electric/electronic components associated with the battery cells, a battery case in which the battery cells and the electric/electronic components are mounted, and a cover by which the top of the battery case is covered. A plurality of crossmembers may be fixed to the inside of the battery case, and stiffness and strength of the battery case may be improved by the plurality of crossmembers. The high-voltage battery assembly may be mounted to a floor panel of the vehicle body.

A pair of side sills may be mounted on both sides of the floor panel. Each side sill may include an inner side sill and an outer side sill, and a side reinforcement formed of an aluminum extruded product may be mounted in the inner side sill. A pair of side flanges may be provided on both sides of the battery case. As each side flange is fastened to each side sill through a bolt, a cylindrical nut (pipe nut), etc., the high-voltage battery assembly may be mounted to each side sill.

It is desired for an electric vehicle to increase the battery size in order to increase a driving range and safely protect the battery assembly from a collision or impact.

We have discovered that, in an electric vehicle equipped with a sliding door, a roller guide track for guiding the sliding door is located in the side sill, which reduces the width of the battery. Accordingly, it is difficult to increase the capacity of the battery, which has limited the driving range of the electric vehicle.

In addition, we have also found that the side sills and center side members located on both sides of a center floor are not physically connected, resulting in reduced impact stiffness and support stiffness of the side sills and failing to effectively distribute an impact load transferred through the side sills.

The above information described in this background section is provided to assist in understanding the background of the inventive concept, and may include any technical concept which is not considered as the prior art that is already known to those skilled in the art.

SUMMARY

The present disclosure provides a side sill structure for a vehicle capable of firmly supporting a battery assembly and uniformly distributing an impact load.

According to an aspect of the present disclosure, a side sill structure for a vehicle may include: a side sill which is connected to an edge of a center floor, and has a first cavity and a second cavity which are divided by a partition; a reinforcing member which is received in the first cavity of the side sill, and is deformable by an impact load; and a component which is accommodated in the second cavity of the side sill, wherein the second cavity may be located above the first cavity.

The side sill structure may further include a battery case which is mounted under the center floor, and the battery case has a side mount which is connected to the reinforcing member through a fastener.

The first cavity and the reinforcing member may be horizontally aligned with the battery case in a width direction of the vehicle.

The second cavity and the component may be located higher than the battery case.

The side sill may have an opening communicating with the second cavity.

The side sill structure may further include a center side member which is joined to a bottom surface of the center floor, and the side sill may have a first flange which is joined to the edge of the center floor and a second flange which is joined to the center side member.

The side sill may include an outboard side wall facing an exterior of the vehicle, an inboard side wall facing an interior of the vehicle, a bottom wall connecting the outboard side wall and the inboard side wall, a top wall horizontally aligned with the center floor, and a middle wall extending toward the center side member. The first flange may extend from the top wall, and the second flange may extend from the middle wall.

The bottom wall may be located above the side mount, and the middle wall may be located higher than a top surface of the battery case.

The side sill may include an outboard side wall facing an exterior of the vehicle, an inboard side wall facing an interior of the vehicle, a bottom wall connecting the outboard side wall and the inboard side wall, a top wall horizontally aligned with the center floor, an extension wall extending toward a center of the center floor, and a reinforcement wall extending from the extension wall toward the center floor. The reinforcement wall may be joined to the center floor.

The bottom wall may be located above the side mount, and the extension wall may be located higher than a top surface of the battery case.

The component may be a roller guide track which is mounted on a surface forming the second cavity.

The component may be a step which is accommodated in the second cavity or is deployed from the second cavity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
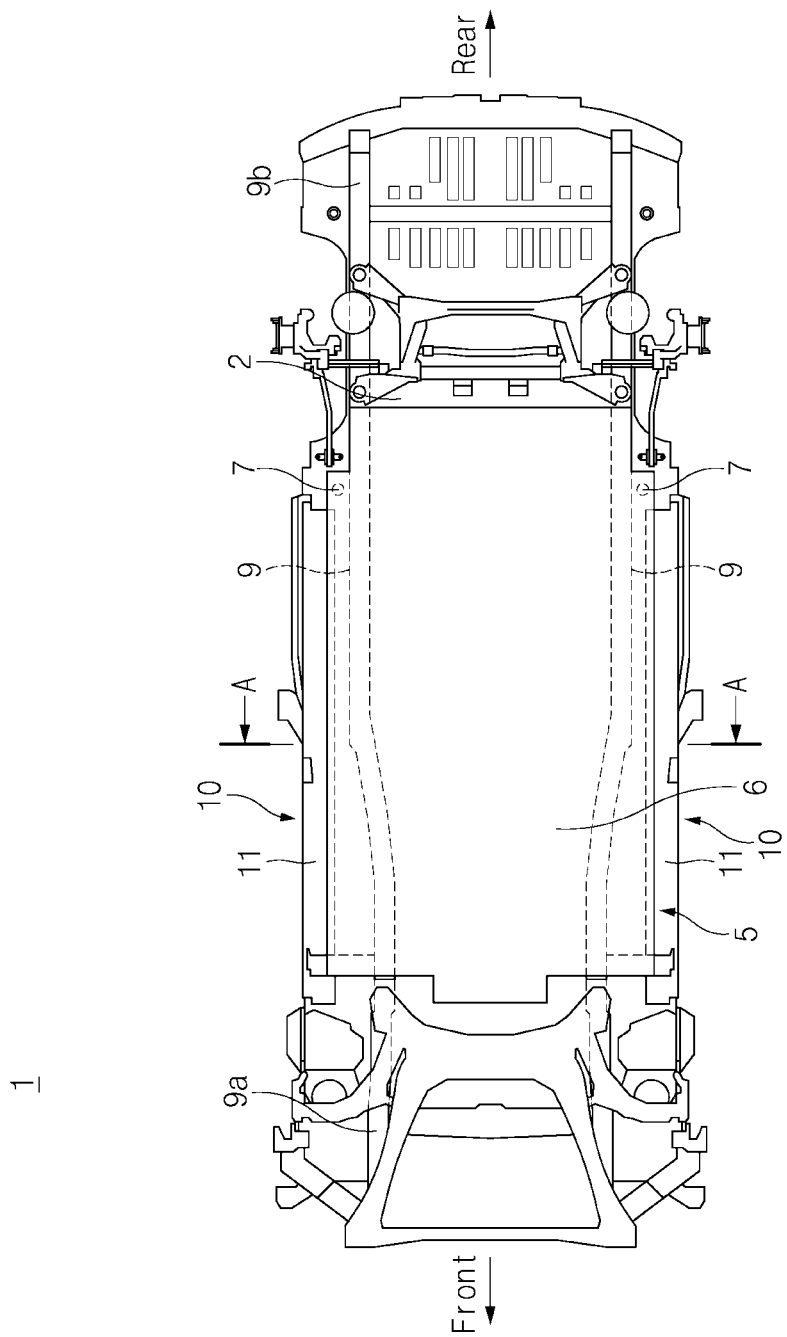
FIG. 1 illustrates a bottom view of a bottom surface of a vehicle body according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, exemplary forms of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary forms of the present disclosure. These teams are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 2:
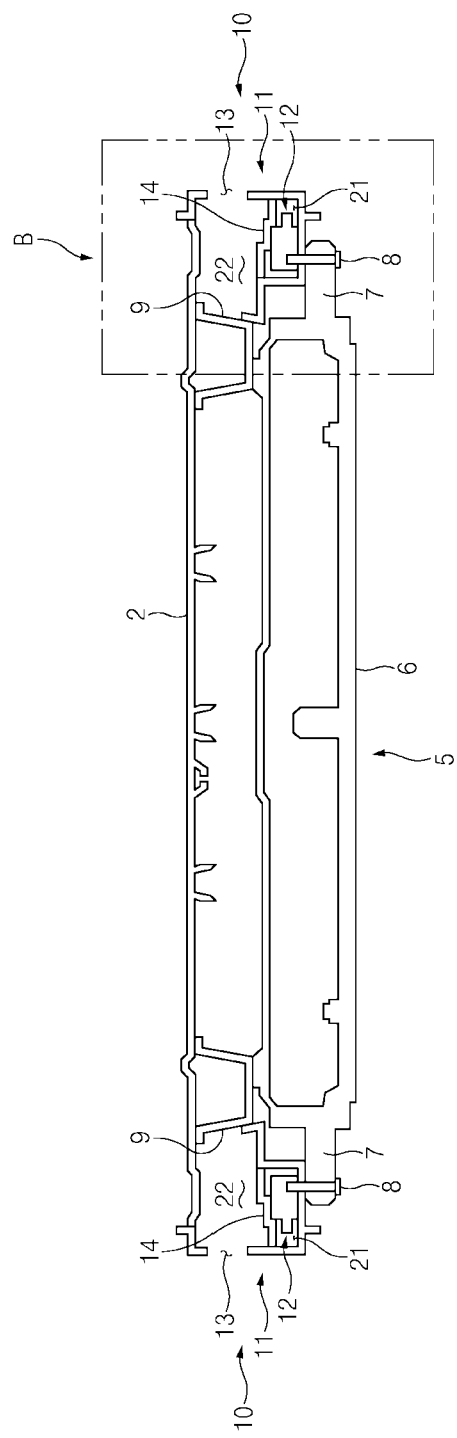
FIG. 2 illustrates a cross-sectional view taken along line A-A of FIG. 1.

Referring to FIGS. 1 and 2, a floor structure of a vehicle body 1 according to an exemplary form of the present disclosure may include a center floor 2, a pair of side sills 11 connected to both side edges of the center floor 2, and a battery assembly 5 mounted under the center floor 2.

The center floor 2 may be disposed on the bottom of the vehicle body to form a floor of the vehicle body. A pair of center side members 9 may be mounted on a bottom surface of the center floor 2, and the pair of center side members 9 may be spaced apart from each other in a width direction of the vehicle body. The center side members 9 may be adjacent to the corresponding side sills 11, respectively. Each center side member 9 may be located closer to the center of the center floor 2, than the corresponding side sill 11. Each center side member 9 may extend in a longitudinal direction of the vehicle body, and the center side member 9 may be integrally connected to a front side member 9a and a rear side member 9b.

Each side sill 11 may extend in the longitudinal direction of the vehicle body 1. The pair of side sills 11 may be joined to both side edges of the center floor 2 by welding, using fasteners, and/or the like, respectively.

Figure 3:
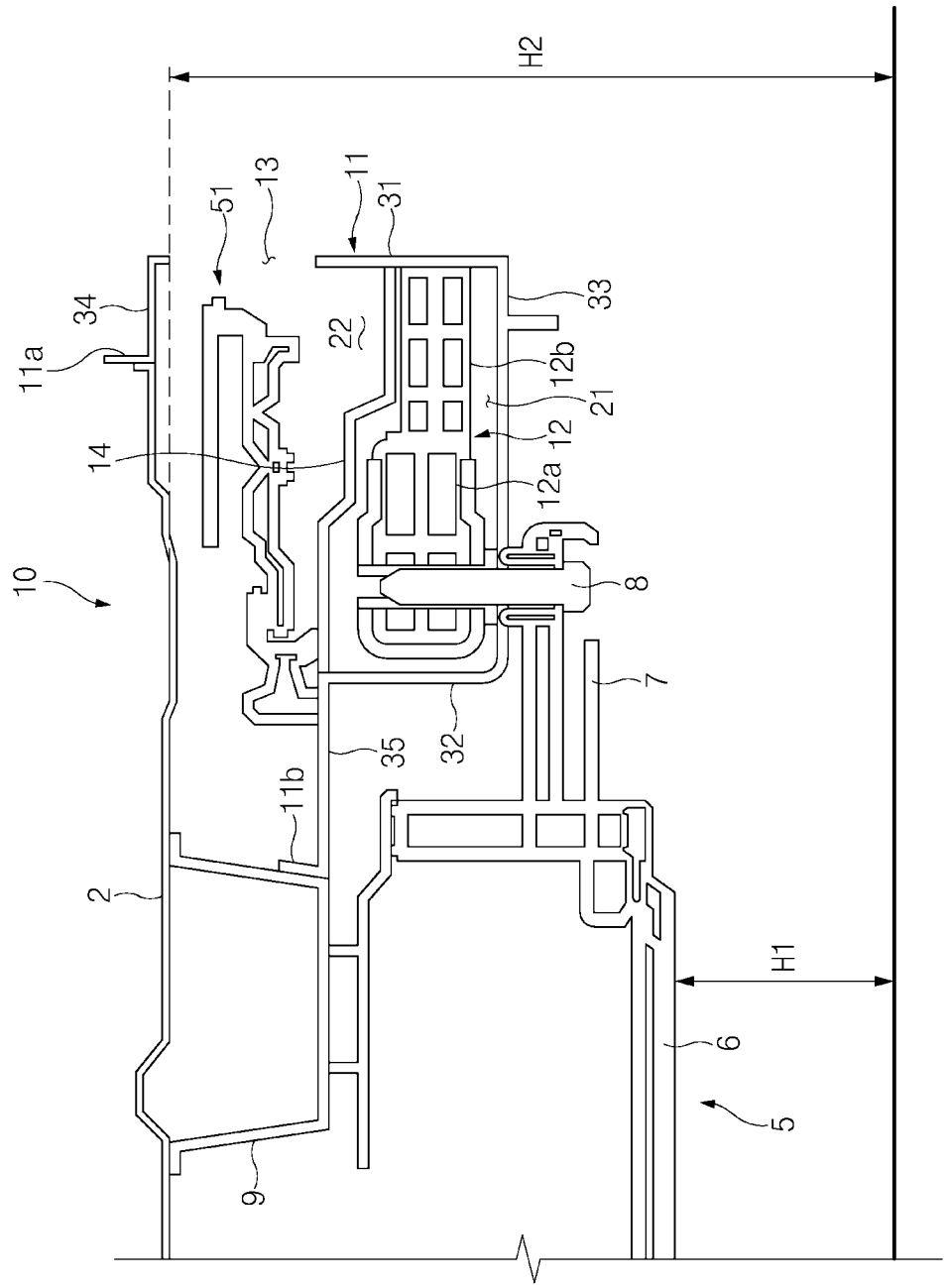
FIG. 3 illustrates an enlarged view of portion B of FIG. 2, a side sill structure for a vehicle according to an exemplary form of the present disclosure.

Referring to FIG. 3, a side sill structure 10 for a vehicle according to an exemplary form of the present disclosure may include the side sill 11 having a first cavity 21 and a second cavity 22 divided by a partition 14, a reinforcing member 12 mounted in the first cavity 21 of the side sill 11, and components 51 and 60 mounted in the second cavity 22 of the side sill 11.

Each side sill 11 may have a first flange 11a joined to the edge of the center floor 2 and a second flange 11b joined to the center side member 9. The first flange 11a and the edge of the center floor 2 may be joined by welding, using fasteners, and/or the like, and the second flange 11b and the center side member 9 may be joined by welding, using fasteners, and/or the like. As each side sill 11 is directly and physically connected to the center side member 9 through the second flange 11b, crashworthiness and support stiffness of the side sill 11 may be improved. An impact load in a side impact of the vehicle may be transferred to the center side member 9 through the side sill 11, and the impact load transferred to the center side member 9 may be distributed in a longitudinal direction of the center side member 9, and thus the impact load may be dissipated or absorbed.

Each side sill 11 may have a cavity, and the cavity of the side sill 11 may be divided into the first cavity 21 and the second cavity 22 by the partition 14. The first cavity 21 may receive the reinforcing member 12, and the reinforcing member 12 may be mounted on a surface forming the first cavity 21 through a plurality of brackets and/or the like. The second cavity 22 may accommodate various components such as a roller guide track 51 (see FIGS. 3 to 5) guiding a roller of a sliding door and a step 60 deployable toward the outside of the vehicle. The first cavity 21 may be horizontally aligned in the width direction of the vehicle with respect to a battery case 6 of the battery assembly 5, and the second cavity 22 may be located above the first cavity 21 so that the second cavity 22 may be located higher than the battery assembly 5 in a height direction of the vehicle. Thus, the components 51 and 60 accommodated in the second cavity 22 may not directly hit the battery assembly 5 during a collision of the vehicle. In particular, the second cavity 22 and the components 51 and 60 may be horizontally aligned with the center side member 9 in the width direction of the vehicle, and the components 51 and 60 moved by the impact load during the impact (collision) of the vehicle may hit the center side member 9, and thus the battery case 6 of the battery assembly 5 may be safely protected.

Each side sill 11 may have an opening 13 through which the roller of the sliding door or the step 60 passes, and the opening 13 may communicate with the second cavity 22.

The reinforcing member 12 may have a plurality of ribs so that it may be deformable by the impact load. The reinforcing member 12 may be an extruded product formed by an extrusion method. The reinforcing member 12 may be made of aluminum or an aluminum alloy material, and the reinforcing member 12 may extend in a longitudinal length direction of the side sill 11.

The battery assembly 5 may include the battery case 6 in which one or more battery cells (or battery modules) and electric/electronic components associated with the battery cells are mounted. The battery case 6 may have a pair of side mounts 7 connected to the pair of side sills 11. Each side mount 7 may be connected to the reinforcing member 12 by a fastener 8 such as a bolt, a pipe, etc. The battery assembly 5 may be connected and supported to the pair of side sills 11 through the pair of side mounts 7.

The first cavity 21 and the reinforcing member 12 of each side sill 11 may be horizontally aligned with the battery case 6 of the battery assembly 5 in the width direction of the vehicle, and thus a side surface of the battery assembly 5 may be safely protected by the side sill 11 and the reinforcing member 12.

The reinforcing member 12 may include a first portion 12a and a second portion 12b integrally connected to the first portion 12a. The side mount 7 of the battery case 6 may be connected to the first portion 12a through the fastener 8, and a cross-sectional area of the first portion 12a may be larger than a cross-sectional area of the second portion 12b. Thus, connection stiffness of the side mount 7 of the battery case 6 may be increased.

The partition 14 may have a shape corresponding to a cross-sectional contour of the reinforcing member 12 received in the first cavity 21 and the shapes and structures of the components 51 and 60 accommodated in the second cavity 22. The partition 14 may determine a cross-sectional shape of the first cavity 21 and a cross-sectional shape of the second cavity 22.

Figure 4:
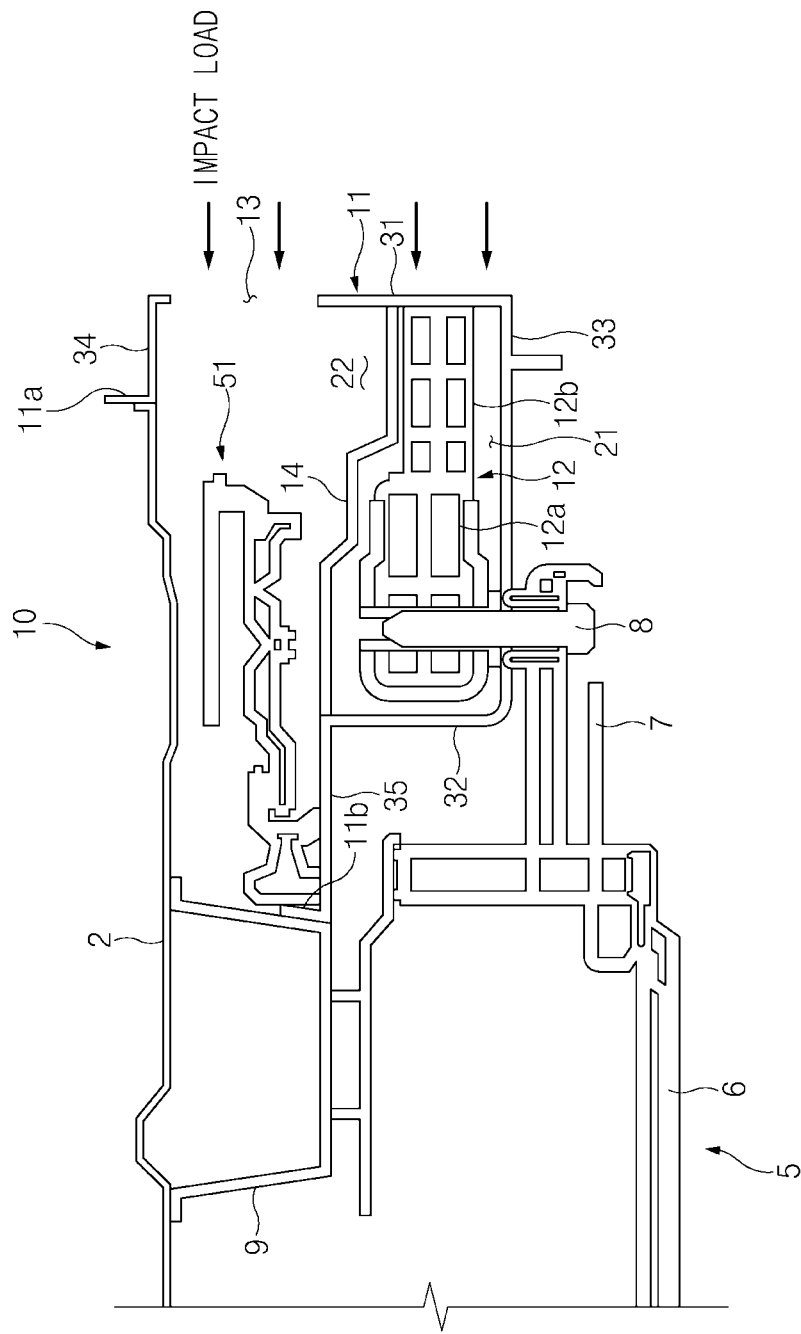
FIG. 4 illustrates a state of the structure of FIG. 3 in which a roller guide track is moved toward a center side member by an impact load during a side impact.

Referring to FIGS. 3 and 4, the side sill 11 may include an outboard side wall 31 facing the exterior of the vehicle, an inboard side wall 32 facing the interior of the vehicle, a bottom wall 33 connecting the outboard side wall 31 and the inboard side wall 32, a top wall 34 horizontally aligned with the center floor 2, and a middle wall 35 extending toward the center side member 9. The first flange 11a may extend upwardly from the top wall 34, and the second flange 11b may extend upwardly from the middle wall 35. The middle wall 35 may be flush with at least a portion of the partition 14, and the middle wall 35 may be flush with the bottom of the center side member 9. The inboard side wall 32 and the middle wall 35 may be perpendicular to each other.

The bottom wall 33 may be located above the side mount 7 of the battery case 6, the inboard side wall 32 may face a side wall of the battery case 6, the middle wall 35 may extend horizontally between the top wall 34 and the bottom wall 33, the middle wall 35 and the center side member 9 may be located higher than a top surface of the battery case 6, and an edge of the battery case 6 may be located between the inboard side wall 32 and the middle wall 35. The inboard side wall 32 of the side sill 11 may cover the side surface of the battery case 6, and the middle wall 35 of the side sill 11 and the center side member 9 may cover a top edge of the battery case 6, and thus the edge of the battery case 6 may be safely protected by the side sill 11 and the center side member 9. Since the edge of the battery case 6 of the battery assembly 5 is protected by the inboard side wall 32 and the middle wall 35 of the side sill 11 and the center side member 9, a width of the battery case 6 may be increased compared to the related art, and accordingly the capacity of the battery assembly 5 may be increased. In addition, as the width of the battery case 6 is increased, a ground clearance H1 of the battery case 6 and a ground clearance H2 of the center floor 2 may be lowered compared to the related art, and the center floor 2 may be flattened, and thus a passenger compartment of the vehicle may be sufficiently secured.

Referring to FIGS. 3 and 4, the roller guide track 51 guiding the roller of the sliding door may be mounted on a surface forming the second cavity 22 of the side sill 11, and the second cavity 22 and the roller guide track 51 may be located higher than the battery assembly 5. That is, since the second cavity 22 and the roller guide track 51 are not horizontally aligned with the battery assembly 5, the roller guide track 51 may be prevented from hitting the battery assembly 5 during an impact of the vehicle.

Referring to FIG. 4, an impact load during collision of the vehicle may be distributed to the reinforcing member 12 received in the first cavity 21 of the side sill 11 and the roller guide track 51 mounted on the surface forming the second cavity 22 of the side sill 11. The reinforcing member 12 may be deformed by the impact load to absorb the impact load, and the roller guide track 51 may be moved toward the center side member 9 by the impact load, and thus the impact load may be dissipated or absorbed by the center side member 9.

Figure 5:
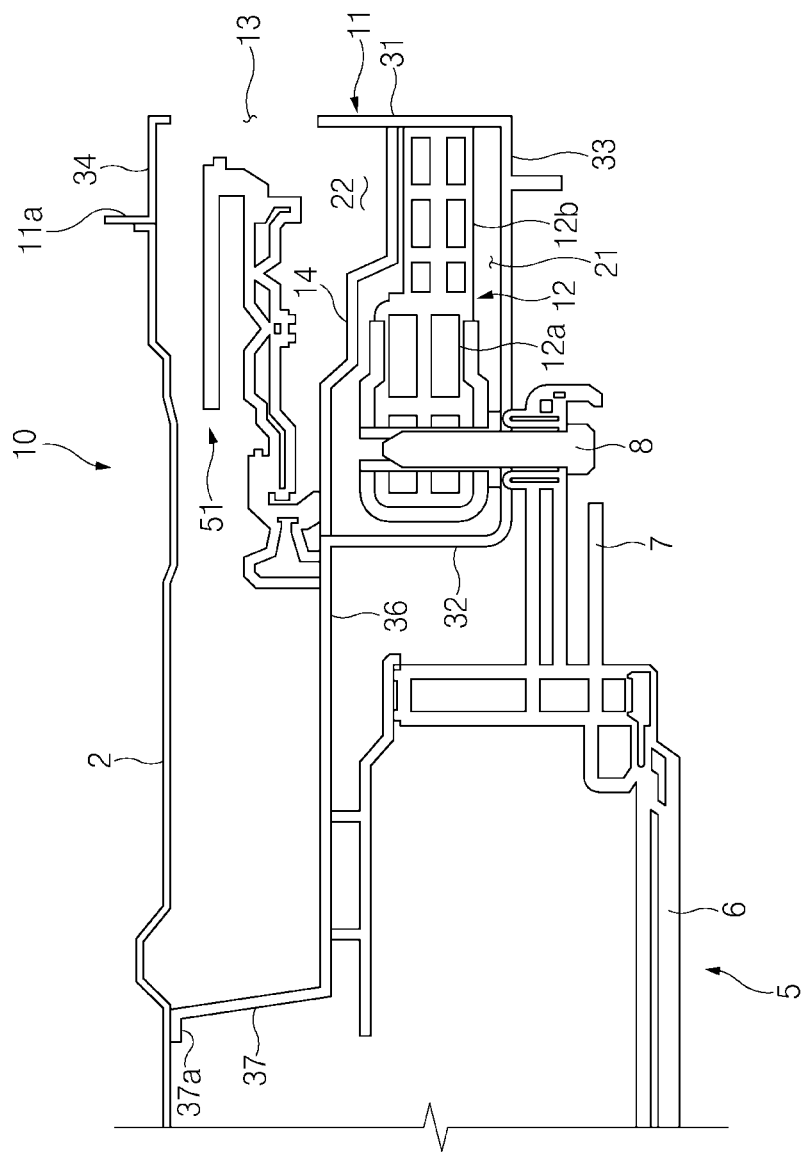
FIG. 5 illustrates a side sill structure for a vehicle according to another exemplary form of the present disclosure.

FIG. 5 illustrates a side sill structure for a vehicle according to another exemplary form of the present disclosure. Referring to FIG. 5, the side sill 11 may include an extension wall 36 extending from the inboard side wall 32 toward the center of the center floor 2, and a reinforcement wall 37 extending from the extension wall 36 toward the center floor 2. The extension wall 36 and the reinforcement wall 37 may extend in the longitudinal direction of the vehicle, and the extension wall 36 and the inboard side wall 32 may be perpendicular to each other. In the form of FIG. 5, the second flange is removed, and the reinforcement wall 37 and the extension wall 36 may replace the roles of the middle wall 35 and the center side member 9 illustrated in FIGS. 3 and 4. That is, the extension wall 36 may be a unitary one-piece structure of the middle wall 35 and the center side member 9 illustrated in FIG. 3. The extension wall 36 may be flush with at least a portion of the partition 14, and the extension wall 36 may have a length enough to cover a portion of the top surface of the battery case 6. A top end of the reinforcement wall 37 may have a flange 37a, and the flange 37a may be joined to the bottom surface of the center floor 2 by welding and/or the like. Thus, the support stiffness and crashworthiness of the side sill 11 may be improved by the extension wall 36 and the reinforcement wall 37.

The extension wall 36 may extend horizontally between the top wall 34 and the bottom wall 33 and be located higher than the top surface of the battery case 6, and the edge of the battery case 6 may be located between the inboard side wall 32 and the extension wall 36. The inboard side wall 32 of the side sill 11 may cover the side surface of the battery case 6, and the extension wall 36 of the side sill 11 may cover the top edge of the battery case 6, and thus the edge of the battery case 6 may be safely protected by the side sill 11 and the extension wall 36. Since the edge of the battery case 6 of the battery assembly 5 is protected by the inboard side wall 32 and the extension wall 36 of the side sill 11, the width of the battery case 6 may be increased compared to the related art, and accordingly the capacity of the battery assembly 5 may be increased. In addition, as the width of the battery case 6 is increased, the ground clearance of the battery case 6 and the ground clearance of the center floor 2 may be lowered compared to the related art, and the center floor 2 may be flattened, and thus the passenger compartment of the vehicle may be sufficiently secured.

Figure 6:
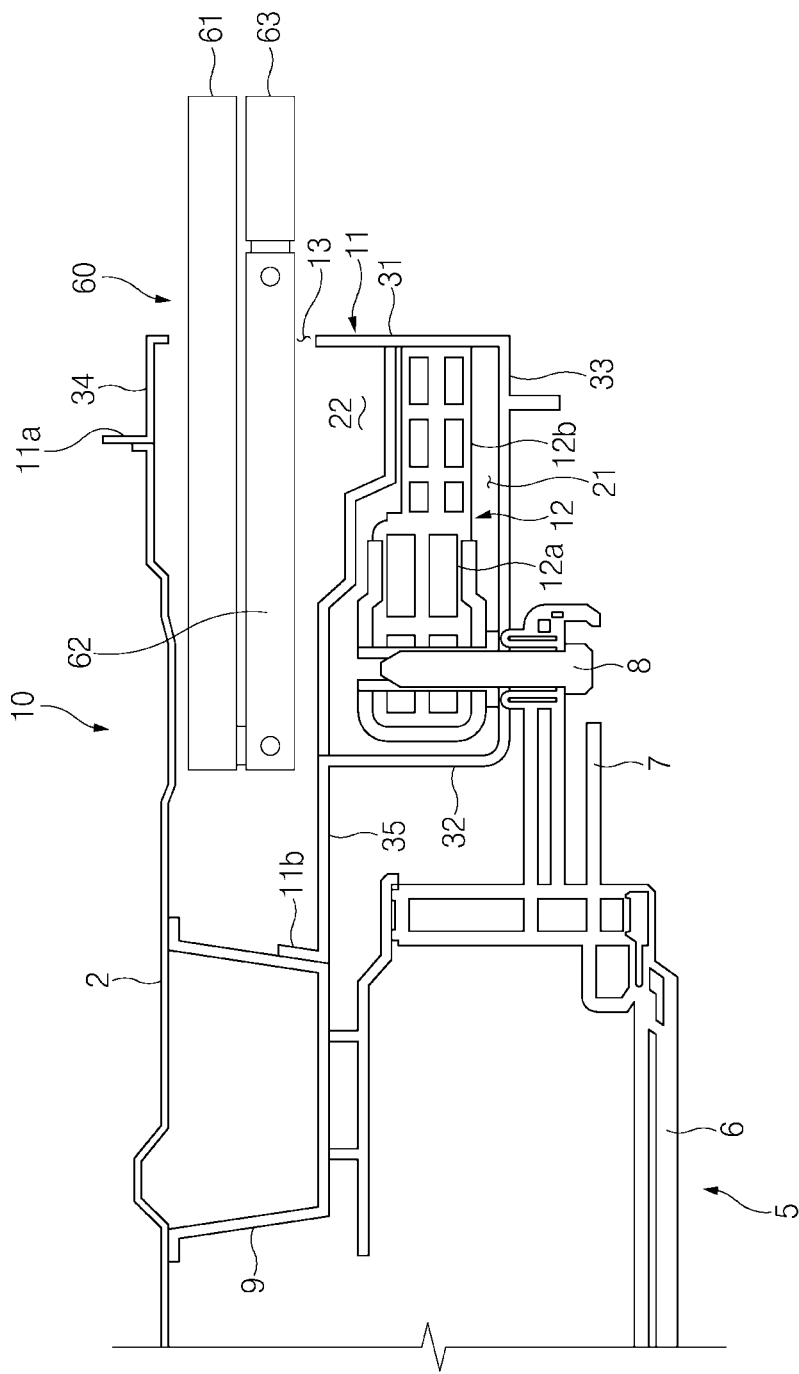
FIG. 6 illustrates a side sill structure for a vehicle according to another exemplary form of the present disclosure, in a state in which a step is received in a second cavity of a side sill.
Figure 7:
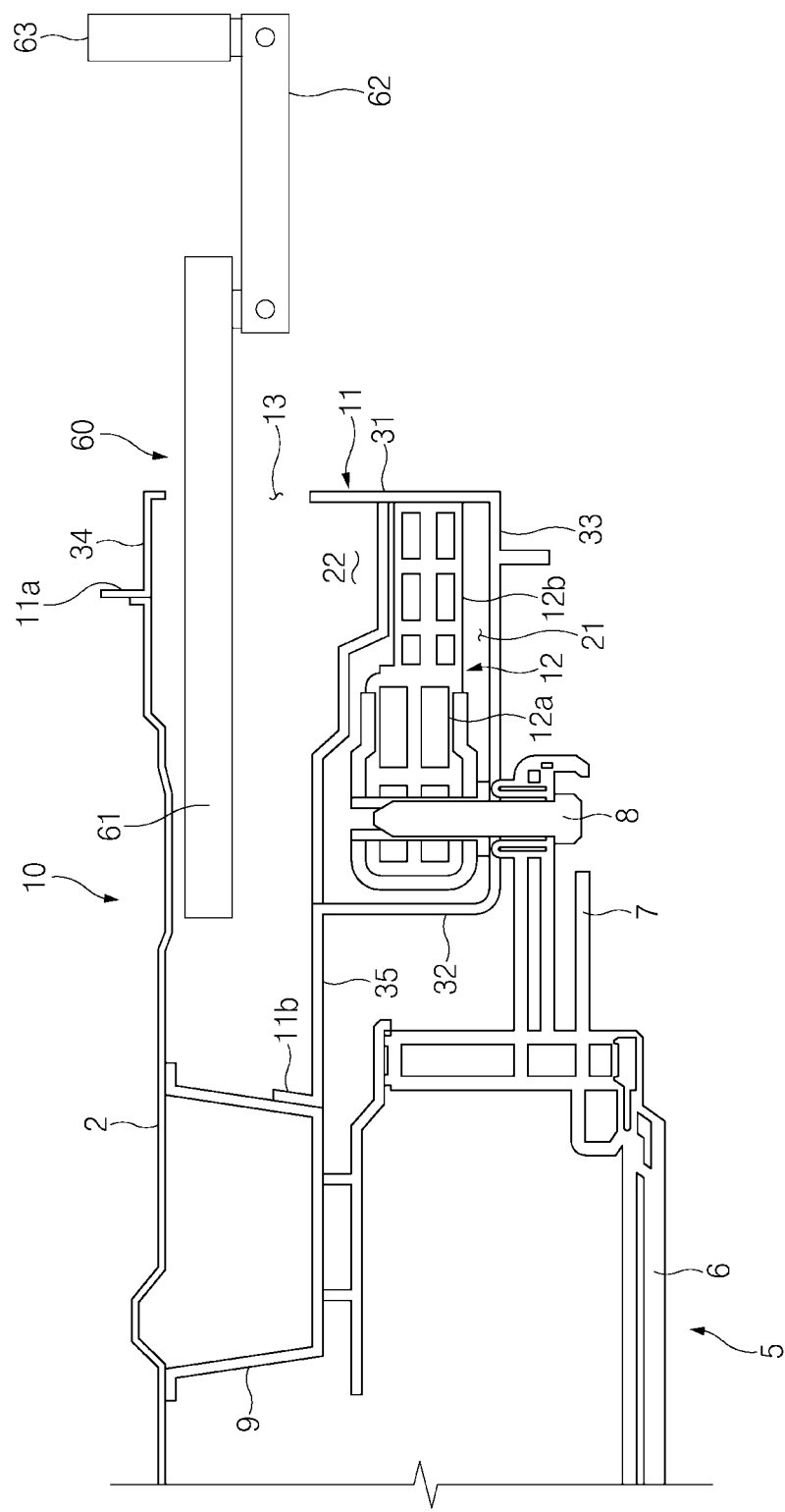
FIG. 7 illustrates a state in which the step is partially deployed in the side sill structure of FIG. 6.
Figure 8:
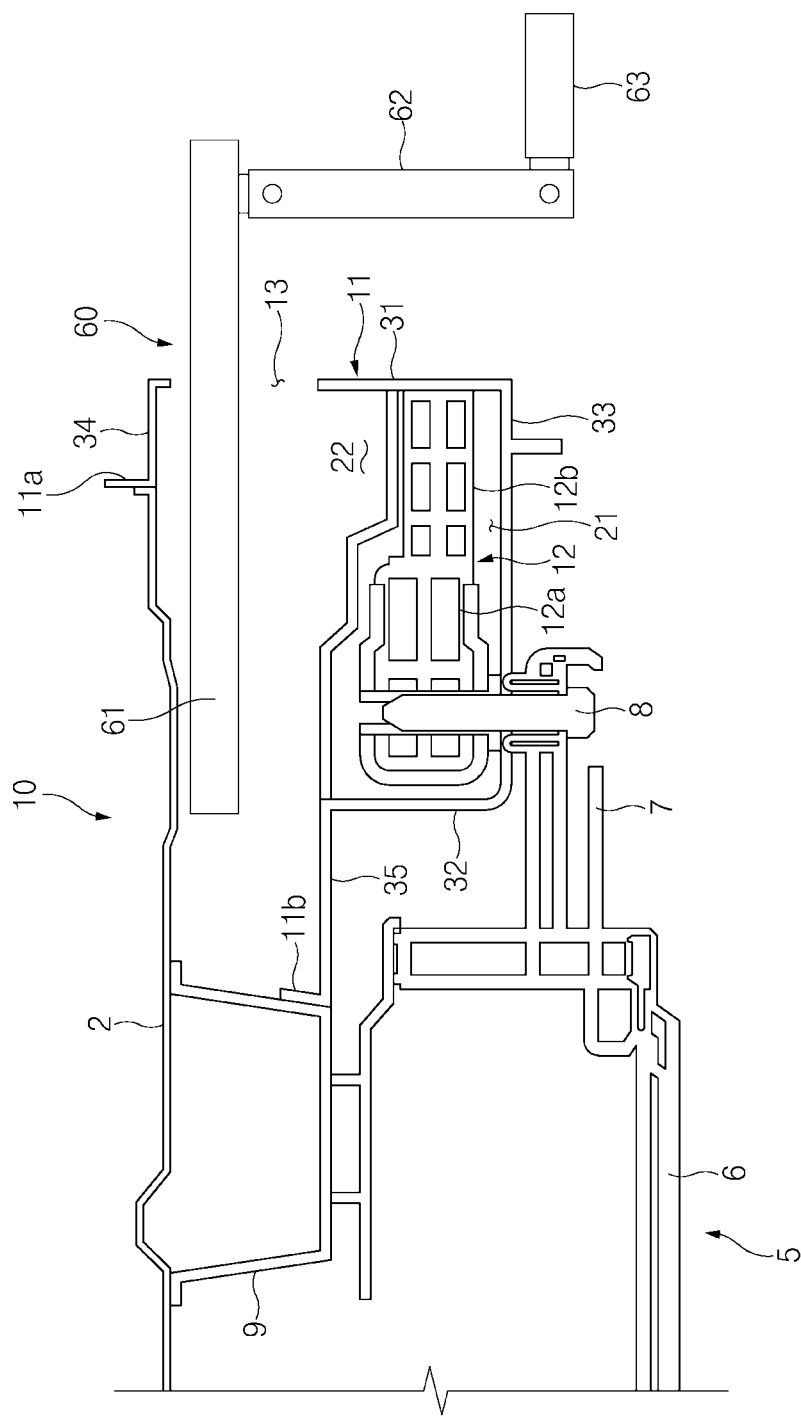
FIG. 8 illustrates a state in which the step is fully deployed in the side sill structure of FIG. 7.

FIGS. 6 to 8 illustrate a side sill structure for a vehicle according to another exemplary form of the present disclosure. Referring to FIG. 6, the step 60 for assisting passengers to get into and exit the vehicle may be accommodated in the second cavity 22 of the side sill 11, and the step 60 may be movable between a received position (see FIG. 6) in which the step 60 is accommodated in the second cavity 22 and a deployed position (see FIG. 8) in which the step 60 is fully deployed from the second cavity 22 toward the outside of the vehicle to assist the passengers to get into or exit the vehicle. The step 60 may include a first step member 61 mounted on the surface forming the second cavity 22, a second step member 62 mounted slidably and pivotally with respect to the first step member 61, and a third step member 63 mounted pivotally with respect to the second step member 62.

As illustrated in FIG. 6, when the step 60 is in the received position, the first step member 61, the second step member 62, and the third step member 63 may overlap one another, and be received in the second cavity 22. As illustrated in FIG. 7, when the step 60 is partially deployed from the second cavity 22, the second step member 62 may slide along the first step member 61 toward the outside of the vehicle. As illustrated in FIG. 8, when the step 60 is in the deployed position, the third step member 63 may pivot with respect to the second step member 62 and the third step member 63 may be unfolded horizontally.

As set forth above, according to exemplary forms of the present disclosure, the side sill structure may have the first cavity receiving the reinforcing member to which the battery case of the battery assembly is connected and the second cavity receiving various components such as the roller guide track, and the second cavity may be located higher than the first cavity. By preventing the components received in the second cavity from directly hitting the battery assembly during an impact (collision) of the vehicle, the battery assembly may be safely protected.

According to exemplary forms of the present disclosure, since the edge of the battery case of the battery assembly is protected by the inboard side wall of the side sill and the center side member (or the extension wall), the width of the battery case is increased compared to the related art, and accordingly the capacity of the battery assembly is increased. In addition, as the width of the battery case is increased, the ground clearance of the battery case and the ground clearance of the center floor is lowered compared to the related art, and the center floor may be flattened, and thus the passenger compartment of the vehicle is sufficiently secured.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A side sill structure for a vehicle, the side sill structure comprising:
   a side sill which is connected to an edge of a center floor, and has a first cavity and a second cavity which are divided by a partition;
   a reinforcing member which is received in the first cavity of the side sill, and is deformable by an impact load; and
   a component which is accommodated in the second cavity of the side sill,
   wherein the second cavity is located above the first cavity.

2. The side sill structure according to claim 1, further comprising a battery case which is mounted under the center floor,
   wherein the battery case has a side mount which is connected to the reinforcing member through a fastener.

3. The side sill structure according to claim 2, wherein the first cavity and the reinforcing member are horizontally aligned with the battery case in a width direction of the vehicle.

4. The side sill structure according to claim 2, wherein the second cavity and the component are located higher than the battery case.

5. The side sill structure according to claim 2, further comprising a center side member which is joined to a bottom surface of the center floor,
   wherein the side sill has a first flange joined to the edge of the center floor, and a second flange joined to the center side member.

6. The side sill structure according to claim 5, wherein:
   the side sill includes:
      an outboard side wall facing an exterior of the vehicle;
      an inboard side wall facing an interior of the vehicle;
      a bottom wall connecting the outboard side wall and the inboard side wall;
      a top wall horizontally aligned with the center floor; and
      a middle wall extending toward the center side member,
   the first flange extends from the top wall, and
   the second flange extends from the middle wall.

7. The side sill structure according to claim 6, wherein:
   the bottom wall is located above the side mount, and
   the middle wall is located higher than a top surface of the battery case.

8. The side sill structure according to claim 2, wherein:
   the side sill includes:
      an outboard side wall facing an exterior of the vehicle;
      an inboard side wall facing an interior of the vehicle;
      a bottom wall connecting the outboard side wall and the inboard side wall;
      a top wall horizontally aligned with the center floor;
      an extension wall extending toward a center of the center floor; and
      a reinforcement wall extending from the extension wall toward the center floor, and
   the reinforcement wall is joined to the center floor.

9. The side sill structure according to claim 8, wherein:
   the bottom wall is located above the side mount, and
   the extension wall is located higher than a top surface of the battery case.

10. The side sill structure according to claim 1, wherein the side sill has an opening communicating with the second cavity.

11. The side sill structure according to claim 1, wherein the component is a roller guide track mounted on a surface forming the second cavity.

12. The side sill structure according to claim 1, wherein the component is a step which is accommodated in the second cavity or configured to be deployed from the second cavity.

* * * * *